April 18, 1961 G. F. GRONDIN ET AL 2,980,858
DIGITAL SYNCHRONIZATION CIRCUIT OPERATING BY INSERTING EXTRA PULSES INTO OR DELAYING PULSES FROM CLOCK PULSE TRAIN
Filed Dec. 7, 1959 2 Sheets-Sheet 1

INVENTORS
GEORGE F. GRONDIN
RICHARD N. ROYER
BY Moody and Goldman
ATTORNEYS

April 18, 1961 G. F. GRONDIN ET AL 2,980,858
Filed Dec. 7, 1959 2 Sheets-Sheet 2

DIGITAL SYNCHRONIZATION CIRCUIT OPERATING BY INSERTING EXTRA PULSES INTO OR DELAYING PULSES FROM CLOCK PULSE TRAIN

INVENTORS
GEORGE F. GRONDIN
RICHARD N. ROYER
BY Moody and Goldman
ATTORNEYS

United States Patent Office 2,980,858 Patented Apr. 18, 1961

2,980,858

DIGITAL SYNCHRONIZATION CIRCUIT OPERATING BY INSERTING EXTRA PULSES INTO OR DELAYING PULSES FROM CLOCK PULSE TRAIN

George F. Grondin, Van Nuys, and Richard N. Royer, Glendale, Calif., assignors to Collins Radio Company, Cedar Rapids, Iowa, a corporation of Iowa Filed Dec. 7, 1959, Ser. No. 857,890

5 Claims. (Cl. 328—63)

Figure 1:
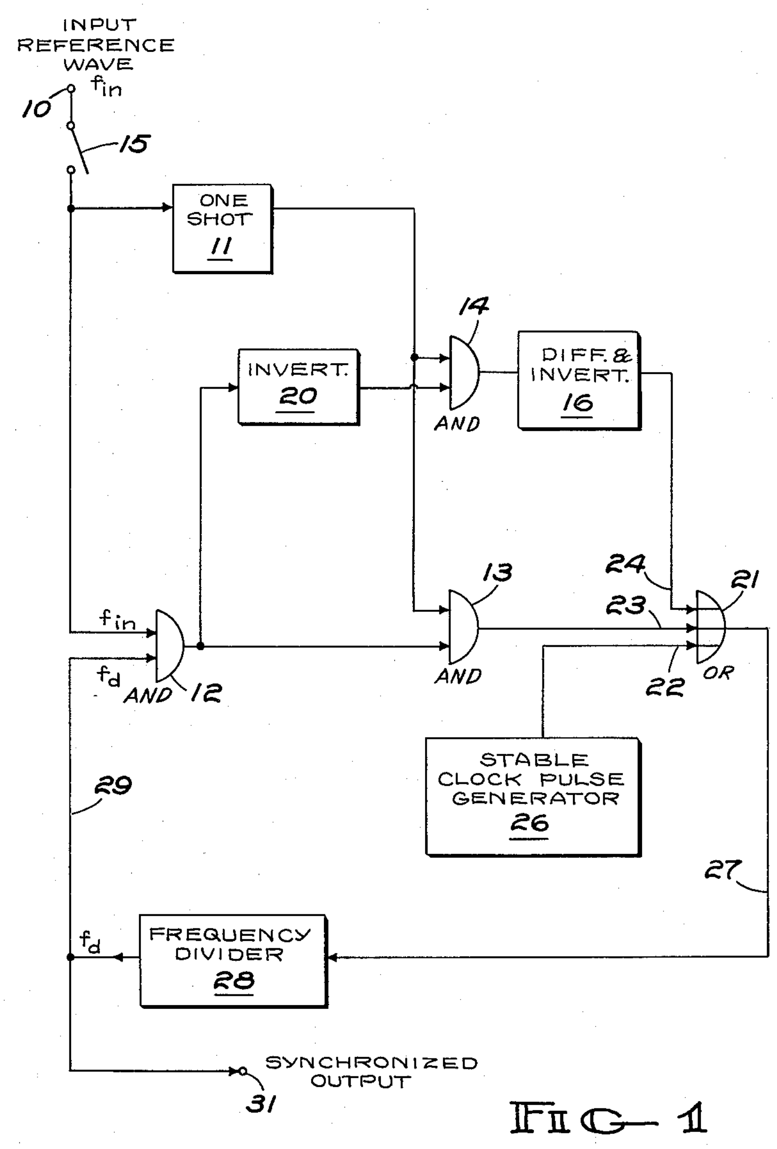

This invention relates to synchronizers that substantially lock the phase of a locally-generated wave to that of a received wave. In particular, it relates to synchronizers having phase storage, wherein an occasional synchronization of a stable local wave can be followed by reliance on its phase rigidity as determined by a stable local frequency source.

Thus, the invention is preferably used in a system that has a local source which is sufficiently stable to retain a preset synchronization for a long period of time. Hence, an input synchronizing wave need be received by the invention only occasionally, and it may be discontinued after a short time has expired during which synchronization has been obtained at a receiver.

It is an object of this invention to provide a synchronizer which is comparatively simple in its construction.

It is another object of this invention to provide a synchronizer which can be made to obtain digital synchronization to any practical degree of accuracy, even though it theoretically cannot obtain perfect synchronization.

It is a further object of this invention to provide a system that can approach synchronization at an approximate predetermined rate.

The invention is an improvement on the general system of obtaining synchronization by the addition or deletion of high-rate pulses to a local input of a pulse-rate divider, which provides a locally-generated output at a required frequency.

Another type of synchronizer using a pulse-rate divider is described and claimed in U.S. Patent application Serial No. 732,900, titled "Digital Phase Storage Circuit," filed May 5, 1958, by Frank Secretan and assigned to the same assignee as the present invention. It permits instantaneous synchronization; while the present invention provides a relatively slow rate of approach to synchronization which under some circumstances makes the present invention less sensitive to the effects of noise impulses.

Very briefly, the invention includes a one-shot relaxation circuit that is triggered by a received signal, with which a local signal is to be synchronized. A stable clock-pulse source is provided that has a much higher rate than the received wave and has a high degree of phase rigidity relative to the received wave. A pulse-rate divider receives the clock pulses through an "or" gate and provides the local wave with a rate equal to that of the received wave. The duration of the one-shot pulses is preferably between one and two periods of the clock-pulse rate. A feedback loop is provided having a first "and" gate that receives the divided output and the incoming signal to obtain an output with a duty cycle dependent upon the phase between the incoming and divider output waves. However, the duty-cycle from the first "and" gate indicates only whether or not synchronization exists, and does not indicate whether the local wave leads or lags the received wave.

Second and third "and" gates determine and respectively compensate the leading and lagging conditions. They receive the one-shot output but only one passes it at a given time, because they also receive the output of the first "and" gate, with inverted relationship. The "or" gate, that passes the clock pulses, also receives the output of the second "and" gate; and furthermore, the "or" gate also receives the output of an inverter-differentiating circuit connected to the output of the third "and" gate. One-shot pulses passed by the second "and" gate during a leading phase condition saturate the "or" gate to effectively block coincident clock pulses to the divider input to retard the phase of the divider output. On the other hand, differentiated one-shot pulses obtained from the inverter-differentiating circuit during a lagging-phase condition provide pulses in addition to the clock-pulses at the divider input to advance the phase of the divider output.

Figure 2:
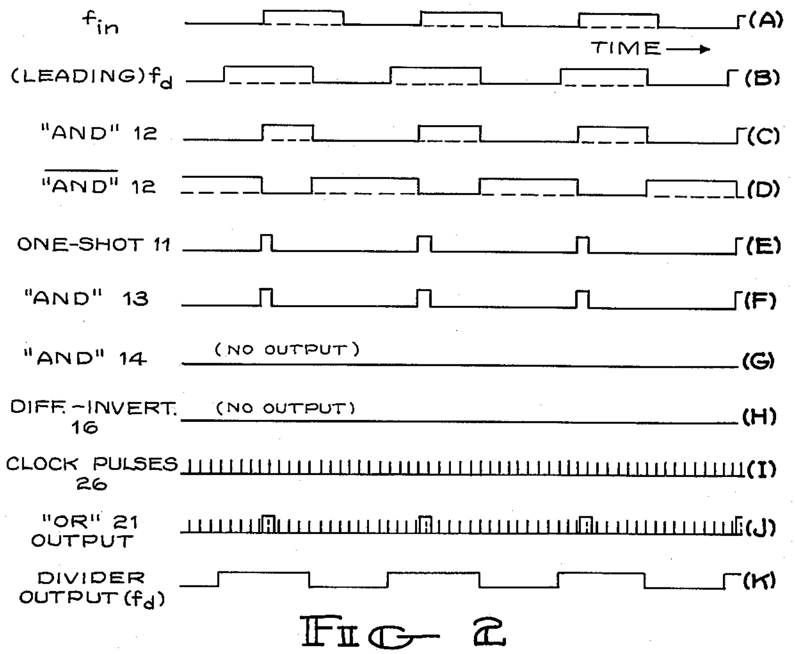
Figure 3:
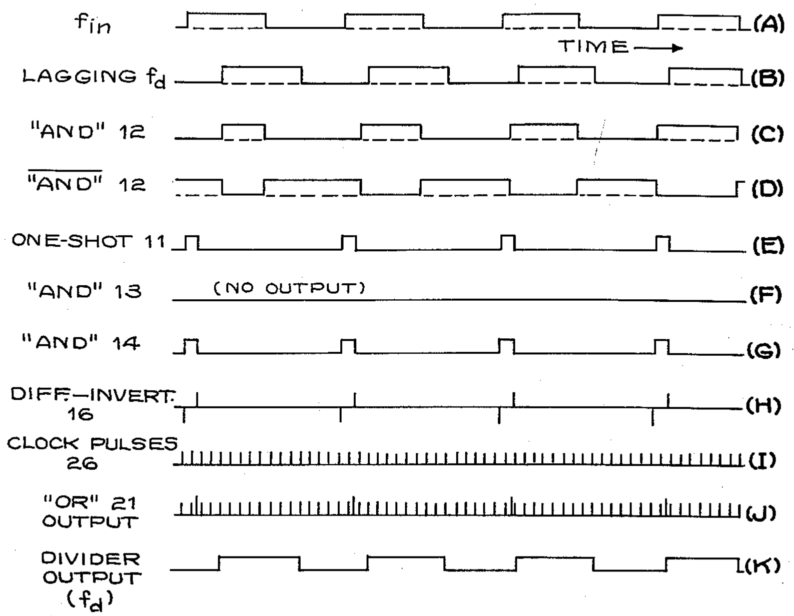

Further objects, features and advantages of this invention will become apparent to one skilled in the art after studying the following specification and the accompanying drawings, in which:

Figure 1 shows an embodiment of the invention; and,

Figures 2 and 3 provide waveforms used in explaining the operation of the invention.

The drawings will now be considered in order to describe a detailed form of the invention, which may be used to provide bit-synchronization for a synchronous digital communication receiver. A bit-synchronized wave is one synchronized with the bits of a received digital signal. It is assumed by way of example that a bit-synchronization wave is transmitted once per day for approximately a five-minute period, and that it is detected and provided at a terminal 10 in Figure 1 as a square wave of frequency $f_{in}$. A clock-pulse generator 26 has sufficient stablity that it can be used to hold a low rate bit-synchronizing square-wave frequency $f_d$ (equal to $f_{in}$) in synchronism for at least a 24-hour period with very little phase drift, once an initial synchronization has been obtained with wave $f_{in}$ during the five-minute period. For example, an oscillator stability of one cycle drift per day at $10^6$ cycles per second can provide a phase stability of less than 1.1 degree drift per day at an information rate of 300 bits per second. This order of stability is well within the present state of the art.

The locally-generated wave $f_d$ is obtained by frequency dividing the output of a stable clock-pulse generator 26 with a frequency divider 28. Thus, the clock rate and the frequency division ratio are chosen to obtain divider output frequency $f_d$ equal to the transmitted frequency $f_{in}$. An "or" gate 21 passes the generator output to the divider.

A switch 15 is connected in series with terminal 10 and is closed either manually or by electronic means at about the time that the synchronization wave $f_{in}$ is first received and is opened when wave $f_{in}$ ceases, or becomes unreliable, or whenever synchronization is obtained.

A one-shot relaxation circuit 11 has its input connected to the other side of switch 15 to receive the reference wave $f_{in}$ when the switch is closed. One-shot 11 may be a trigger circuit of many well-known types, such as a multivibrator, blocking oscillator, phantastron, etc., arranged to be triggered on a one-shot basis by an axis-crossing of an input wave. The positive-going axis-crossing is assumed to trigger in this embodiment.

A first "and" gate 12 likewise has an input connected to switch 15 to receive reference wave $f_{in}$ when switch 15 is closed. Another input of gate 12 receives locally-generated wave $f_d$.

Second and third "and" gates 13 and 14 are provided. Each has an input connected to an output of one-shot 11. Each also has an input connected to an output of "and" gate 12, except that the input to gate 14 is inverted by an inverter 20.

An "or" gate 21 has inputs 22, 23 and 24. Input 22 receives the clock pulses from stable generator 26, input 23 receives the output of "and" gate 13; and input 24 receives the output of differentiator-inverter 16 that differentiates and inverts the output of "and" gate 14. An input of frequency divider 28 receives the output of "or" gate 21.

The operation of Figure 1 is explained with the assistance of Figures 2 and 3. Figure 2 assumes a nonsynchronized condition in which local wave $f_d$ leads reference input wave $f_{in}$; and Figure 3 illustrates a situation where $f_d$ lags $f_{in}$.

Thus, wave $f_d$ in Figure 2(B) leads wave $f_{in}$ in Figures 2(A) by a large amount initially, and gradually approaches in-phase synchronism. Figures 2(C) and (D) show the corresponding outputs from "and" gate 12 that are non-inverted and inverted, respectively, as received by inputs of "and" gates 13 and 14. Figure 2(E) illustrates the output of one-shot 11, and Figure 2(I) illustrates the clock pulses from generator 26. The duration of the pulses from one-shot 11 is equal to approximately 1½ periods of the clock-pulse rate shown in Figure 2(I). The one-shot duration is not critical and preferably is between one and two clock-pulse periods.

In Figure 2(G), no output is provided from "and" gate 14, because there is no positive-polarity coincidence between its inputs while wave $f_d$ has a leading phase. Accordingly, there is no output from differentiator-inverter 16 shown in Figure 2(H).

Figure 2(F) shows the corresponding output of "and" gate 13, which is one-shot pulses that coincide with the non-inverted output of "and" gate 12.

The one-shot pulses hence pass through "and" gate 13 and "or" gate 21 during the leading phase condition. Each one-shot pulse received by "or" gate 21 saturates it, in effect, so that clock pulses occurring during its duration are blocked at its output. Either one or two clock pulses will be obliterated from the "or" gate output, depending upon the timing relationship between the one-shot and clock pulses.

There is no synchronization between the clock pulses and the one-shot pulses that are triggered by detected reference wave $f_{in}$. However, a high-order stability of the clock pulses causes them to maintain a phase rigidity. Figure 2(I) illustrates a timing for the clock pulses. Figure 2(J) shows one-shot pulses superimposed in time upon the clock pulses as occurs in "or" gate 21. The blocked clock pulses are shown by dashed lines.

The divider output is delayed by one clock-pulse period for each blocked clock pulse. Accordingly, the output wave $f_d$ is made to lag by a time increment equal to $$\frac{360}{R}$$

degrees of phase shift per deleted clock pulse, where R is the division ratio of divider 28.

Figure 2(K) provides the corresponding output from divider 28, wherein a division ratio of sixteen is presumed.

Figures 2(K) and 2(B) are precisely the same. The proximity of Figures 2(K) and 2(J) more effectively illustrates the division operation; while the proximity of Figures 2(B) and 2(A) more effectively illustrates the phase relationships.

By plotting output wave $f_d$ of Figure 2(K) one-half cycle at a time, the effects of the feedback loop in Figure 1 are simulated. In Figures 2(A) and (B), it is seen that wave $f_d$ approaches the same phase as the input wave $f_{in}$, and would come substantially into phase if the Figures were plotted further.

The lagging phase conditions are illustrated by Figures 3(A)–(K). The output wave $f_d$ of Figure 3(B) initially lags the input wave $f_{in}$ of Figure 3(A) by a large amount. Figures 3(C) and (D) illustrate the corresponding non-inverted and inverted outputs of "and" gate 12; and Figure 3(E) shows the output of one-shot 11, as it is triggered by the leading edges of input wave $f_{in}$.

No output is provided from "and" gate 13 under circumstances of lagging phase because of lack of coincidence of its positive-polarity inputs.

However, "and" gate 14 is enabled to pass the one-shot pulses, due to the inversion of its input received from "and" gate 12. The one-shot output accordingly passes through "and" gate 14 for a lagging phase condition; and they are differentiated and inverted by circuit 16 to provide the wave shown in Figure 3(H). The inversion of circuit 16 makes the trailing-edge differentiated pulses positive in polarity. In this embodiment, it is presumed that "or" gate 21 passes only positive pulses, and that negative pulses from circuit 16 are neglected. The positive pulses pass through "or" gate 21 and add to the clock pulses received by divider 28 as shown in Figure 3(J). Figure 3(K) illustrates the corresponding output $f_d$ of divider 28. Each added pulse effectively advances the divider output phase in a leading direction by $$\frac{360}{R}$$

degrees.

The output wave $f_d$, which is the same in Figures 3(K) and (B), was plotted one-half cycle at a time in order to simulate the feedback relationship found in the circuit of Figure 1. Accordingly, it can be seen in Figures 3(A) and (B) that output wave $f_d$ gradually approaches the same phase as input wave $f_{in}$, and they would come into phase if the waves in Figure 3 were extended in time.

A theoretically perfect in-phase condition cannot be obtained by the embodiment of Figure 1 because of two conditions, which are: (1) the axis-crossings of wave $f_d$ are phase-locked with the clock pulses; and the clock pulses have a random phase relationship to the received wave $f_{in}$, since no synchronization is provided between them; and (2) as long as received wave $f_{in}$ is provided, jitter will exist in output wave $f_d$ in the order of $$\frac{360°}{R}$$

after the local wave $f_d$ axis-crossings have locked with the clock pulses most nearly in-phase with the axis-crossings of the received wave $f_{in}$. If a perfect in-phase condition is obtained, jitter is caused by one-shot pulses passing through "and" gate 13 to block a clock pulse and shift the waves slightly out of phase; and then "and" gate 14 passes the next one-shot pulse to bring the waves back into phase, thus causing the jitter.

The jitter is removed, however, when wave $f_{in}$ is discontinued at the one-shot input. Accordingly, wave $f_{in}$ is discontinued when the system has arrived at its most nearly in-phase situation. This can be assured merely by waiting a period of time which exceeds a time required to receive that number of $f_{in}$ cycles equal to the number of clock pulses occurring in one-quarter of an $f_{in}$ cycle.

Once input wave $f_{in}$ ceases, there can no longer be any pulse additions or deletions at "or" gate 21. Consequently, only the phase-stable clock pulses pass through the "or" gate; and the divider output wave $f_d$ will have this stability. Furthermore, wave $f_d$ will retain the phase that it had when wave $f_{in}$ ceases. Wave $f_d$ will maintain this phase over a long period of time with little drift, where clock-pulse generator 26 has a high order of stability. An output phase error will exist which should never exceed $$2\left(\frac{360}{R}\right)$$

and should ordinarily be less than $$\frac{360°}{R}$$

The phase error $$2\left(\frac{360}{R}\right)$$

is obtained when the random phase between the clock pulses and wave $f_{in}$ is such that the one-shot pulses block two clock pulses, instead of one. The closer the one-shot pulse duration is to one clock-pulse period, the greater the chances are that only one clock-pulse will be blocked per one-shot pulse.

Accordingly, a final phase error can be made as small as required in any practical case by increasing the clock-pulse rate (and the division ratio R of divider 28), until a required phase-error tolerance is satisfied.

Even though the system is within a required tolerance when wave $f_{in}$ ceases, switch 15 should be opened to provide greater isolation of the circuit from noise pulses which might reach terminal 10. Thus, in those cases where difficulty with noise is not encountered, switch 15 may be eliminated.

The rate of approach toward synchronization by wave $f_d$ is approximately $$\left(\frac{360}{R}\right)f_{in}$$

degrees-per-second for this embodiment.

Although this invention has been described with respect to a particular embodiment, it is not to be so limited, as changes and modifications may be made therein which are within the spirit and scope of the invention as defined by the appended claims.

We claim:

1. A digital system for storing the phase of a received wave by means of the output from a frequency-divider comprising, a one-shot relaxation circuit, and a first "and" gate, each having an input connectable with said received wave, said one-shot relaxation circuit being triggered by said wave, said first "and" gate having a second input receiving said output from said frequency divider, second and third "and" gates, each having an input connected to an output of said one-shot, an output of said first "and" gate being connected to another input of said second "and" gate, inverting means connected between an output of said first "and" gate and an input of said third "and" gate, a differentiator being connected to the output of said third "and" gate, a source of pulses; an "or" gate having inputs receiving said pulses, an output of said second "and" gate and an output of said differentiating circuit; and an input of said frequency divider receiving an output of said "or" gate.

2. A digital system for storing the phase of an input reference wave using an output of a frequency divider, including an "or" gate having an output connected to an input of said frequency divider, a source of clock-pulses connected to one input of said "or" gate, a one-shot relaxation circuit, a first "and" gate, switching means serially connecting said input reference wave to inputs of said one shot relaxation circuit and first "and" gate, second and third "and" gates having inputs connected to outputs of said one-shot relaxation circuit, a second input of said second "and" gate being connected to an output of said first "and" gate, inverting means connected between a second input of said third "and" gate and the output of said first "and" gate, an output of said second "and" gate providing another input of said "or" gate, differentiator-inverter means connected between an output of said third "and" gate and a third input of said "or" gate.

3. A system, as defined in claim 2, in which said switching means is a manually-operated switch closed during periods that a synchronizing signal is being received.

4. A system, as defined in claim 1, in which said one-shot relaxation circuit has a pulse duration between one and two periods of the rate of said pulses.

5. A system, as defined in claim 2, in which said received wave has rectangular wave forms and said one-shot relaxation circuit is triggered by leading edges of said rectangular wave form.

References Cited in the file of this patent

UNITED STATES PATENTS

| | | |
|---|---|---|
| 2,490,500 | Young | Dec. 6, 1949 |
| 2,733,339 | Imm | Jan. 31, 1956 |
| 2,853,649 | Davis | Sept. 23, 1958 |
| 2,863,054 | Dobbins | Dec. 2, 1958 |
| 2,923,820 | Liguori et al. | Feb. 2, 1960 |